(12) United States Patent
Dolce et al.

(10) Patent No.: US 12,387,400 B2
(45) Date of Patent: Aug. 12, 2025

(54) SYSTEM AND METHOD FOR RECREATING A PHYSICAL INSTANT ANALOG PRINT DEVELOPING EXPERIENCE FOR A DIGITAL PHOTO

(71) Applicant: FUJIFILM North America Corporation, Valhalla, NY (US)

(72) Inventors: James Dolce, Penfield, NY (US); Ryan Moore, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 107 days.

(21) Appl. No.: 17/967,426

(22) Filed: Oct. 17, 2022

(65) Prior Publication Data
US 2024/0127506 A1 Apr. 18, 2024

(51) Int. Cl.
| | |
|---|---|
| G06T 11/40 | (2006.01) |
| G06V 20/30 | (2022.01) |
| H04L 51/10 | (2022.01) |

(52) U.S. Cl.
CPC .............. *G06T 11/40* (2013.01); *G06V 20/30* (2022.01); *G06T 2210/62* (2013.01); *G06V 2201/10* (2022.01); *H04L 51/10* (2013.01)

(58) Field of Classification Search
CPC ..... G06T 11/40; G06T 2210/62; G06V 20/30; G06V 2201/10; H04L 51/10
USPC .......................................................... 345/589
See application file for complete search history.

(56) References Cited

U.S. PATENT DOCUMENTS

| | | | |
|---|---|---|---|
| 2012/0120094 A1* | 5/2012 | Oiwa | G06T 11/001 345/593 |
| 2013/0283136 A1 | 10/2013 | Weber et al. | |
| 2014/0313352 A1* | 10/2014 | De Rosa | H04N 1/2154 348/207.2 |
| 2015/0338924 A1* | 11/2015 | Watanabe | H04N 23/61 345/156 |

(Continued)

OTHER PUBLICATIONS

POT Martin-PhotographyBlog, "Creating Polaroids From Your Photos" (Year 2009); Feb. 15, 2009; pp. 1-3; XP093132967; Retrieved from the Internet at URL: https://web.archive.org/web/20090603101416/https://martybugs.net/blog/blog.cgi/creativity/PolaroidsFromYourPhotos.html [retrieved on Feb. 20, 2024].*

(Continued)

*Primary Examiner* — Hai Tao Sun
(74) *Attorney, Agent, or Firm* — Woods Oviatt Gilman LLP; Dennis B. Danella, Esq.

(57) ABSTRACT

A system and method for rendering a digital image in order to recreate a physical instant analog print developing experience for the digital image is provided. The method includes, for example, receiving a digital image at a first computing device from a source over a network, the digital image including characteristic(s) (e.g., contrast, saturation, etc.), each characteristic having a received level; detecting whether the digital image is to be gradually rendered over a predetermined time in order to provide a user with a simulated experience of instant analog print developing; and based on the detecting, gradually rendering the digital image on a display associated with the first computing device over the predetermined time, the gradually rendering including increasing a level of the characteristic(s) until the level reaches the corresponding received level.

16 Claims, 8 Drawing Sheets
(2 of 8 Drawing Sheet(s) Filed in Color)

(56) References Cited

U.S. PATENT DOCUMENTS

2017/0053456 A1* 2/2017 Cho .................. G06F 1/163

OTHER PUBLICATIONS

Pot, Martin—Photography Blog; "Creating Polaroids From Your Photos"; Feb. 15, 2009; pp. 1-3; XP093132967; Retrieved from the Internet at URL: https://web.archive.org/web/20090603101416/https://martybugs.net/blog/blog.cgi/creativity/PolaroidsFromYourPhotos.html [retrieved on Feb. 20, 2024].

Kerschbaumer, J., "Extended European Search Report"; European Application No. 23203891.9; Feb. 27, 2024; European Patent Office, Munich, Germany.

* cited by examiner

SYSTEM AND METHOD FOR RECREATING A PHYSICAL INSTANT ANALOG PRINT DEVELOPING EXPERIENCE FOR A DIGITAL PHOTO

FIELD OF THE INVENTION

The present invention is directed to a system and method for recreating a physical instant analog print developing experience for a digital photo. The system includes a computing device that utilizes computer executable instructions to perform a specialized image rendering service that displays a digital image by slowly/gradually rendering the digital image such that it becomes fully visible after a predetermined amount of time.

BACKGROUND OF THE INVENTION

Instant photography cameras have been in existence for a number of years. Part of the excitement and magical experience with instant prints, such as the prints from a FUJIFILM INSTAX camera, is being able to watch your analog film print develop right before your eyes. People have also found it fun and entertaining to take digital photos of their fully developed instant prints and then post these to social media sites such as FACEBOOK and INSTAGRAM, or share them with a friend using various messaging services or directly through other sharing services.

Multiple applications exist that enable sharing of digital images, including GOOGLE PHOTOS and many others. Multiple services existing within smart phone operating systems provide the ability for easily posting a digital image to a social media site or sharing a digital image via a text message or other messaging services.

SUMMARY OF THE INVENTION

The instant photo developing experience is only available today with analog film prints. The present invention recreates the experience of watching an instant print develop before a viewer's eyes when sharing digital photos electronically.

In order to provide the experience, the present invention provides a system and method for recreating a physical instant analog print developing experience for a digital photo. The system includes a computing unit or device that utilizes computer executable instructions to perform a specialized image rendering service that displays a digital image by gradually rendering the digital image to become fully visible over a predetermined amount of time.

In one aspect, a system for rendering a digital image is provided. The system comprises a first computing device, comprising a display, a processor, a memory storing computer readable instructions executable by the processor for performing a method. The method comprises receiving a digital image at the first computing device from a source over a network, the digital image comprising one or more characteristics, each of the one or more characteristics having a received level, detecting whether the digital image is to be gradually rendered over a predetermined time in order to provide a user with a simulated experience of instant analog print developing, and based on the detecting, gradually rendering the digital image on the display associated with the first computing device over the predetermined time, the gradually rendering comprising increasing a level of at least one of the one or more characteristics until the level reaches the received level corresponding thereto.

In another aspect, a method programmed in a memory for execution by a processor in a computing environment for rendering a digital image is provided. The method includes receiving a digital image at a first computing device from a source over a network, the digital image comprising one or more characteristics, each of the one or more characteristics having a received level, detecting whether the digital image is to be gradually rendered over a predetermined time in order to provide a user with a simulated experience of instant analog print developing, and based on the detecting, gradually rendering the digital image on a display associated with the first computing device over the predetermined time, the gradually rendering comprising increasing a level of at least one of the one or more characteristics until the level reaches the received level corresponding thereto.

The first computing device may be a server, or the system may further comprise a server in communication with the first computing device, wherein the digital image is communicated to the first computing device over a network.

In still another aspect, a non-transitory program product storing thereon processor-executable instructions for performing a method is provided. The method includes receiving a digital image at a first computing device from a source over a network, the digital image comprising one or more characteristics, each of the one or more characteristics having a received level, detecting whether the digital image is to be gradually rendered over a predetermined time in order to provide a user with a simulated experience of instant analog print developing, and based on the detecting, gradually rendering the digital image on a display associated with the first computing device over the predetermined time, the gradually rendering comprising increasing a level of at least one of the one or more characteristics until the level reaches the received level corresponding thereto.

The digital image may be communicated directly from the second computing device to the first computing device using, for example, a short-range communications protocol, a mobile messaging application or a desktop messaging application. Also, the second computing device may be a server associated with a social media site, and wherein the first computing device receives the digital image after a request to download the digital image is made using the first computing device. In another aspect, the digital image may be gradually rendered on the first computing device in a first instance of the digital image being displayed on the display of the first computing device, and then the digital image may be displayed as instantly fully rendered on the display of the first computing device for subsequent instances of the digital image being downloaded or viewed using the first computing device.

Digital photos which are shared today are typically displayed fully rendered. The present invention is different from conventional photo sharing technologies in that the rendering of a digital photo is intentionally delayed in a manner that emulates an analog instant print developing experience.

Additional benefits of the above-described system and methods for recreating an instant analog print developing experience for digital photos are set forth in the following discussion.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned and other features and advantages of this invention, and the manner of attaining them, will become apparent and be better understood by reference to the following description of the invention in conjunctions with the accompanying drawings, wherein.

DETAILED DESCRIPTION OF THE INVENTION

Figure 1:
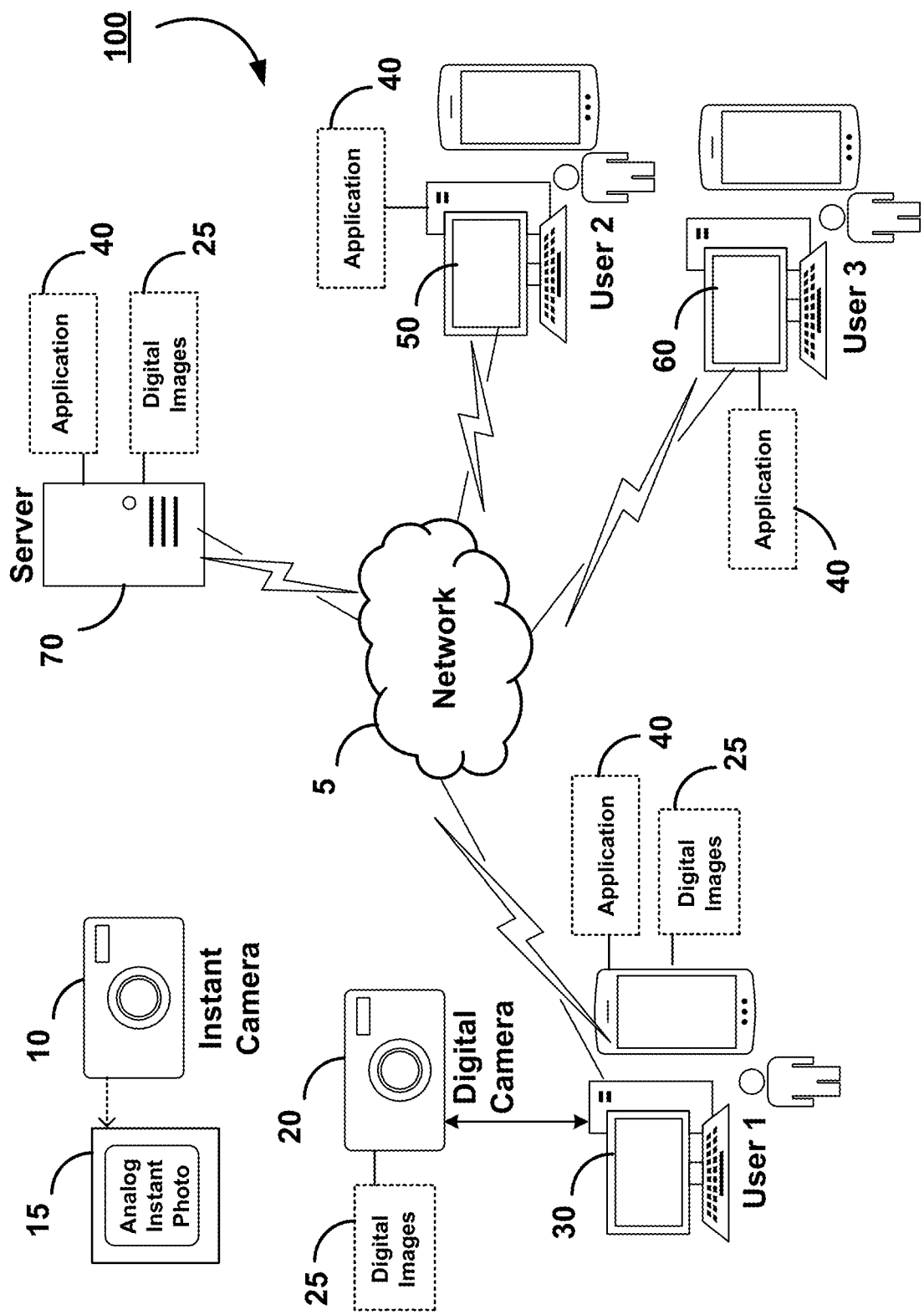
FIG. 1 is a schematic diagram showing one example of a system for recreating an instant analog print developing experience for digital photos in accordance with one aspect of the present invention.

As used herein, the term "gradually rendering" and variations thereof, for example, "gradually rendered," "gradual rendering," etc., refers to rendering a digital image to simulate an instant analog print developing experience to a user over a predetermined time period. The predetermined time period can be any time period that a user could visually perceive the gradual rendering. The gradual aspect of the rendering can include any pattern, for example, rendering by pixel, by groups of pixels, in a certain direction, areas close to one or more edges of a digital image toward the center, random pixel rendering using various algorithms, etc.

As one skilled in the art will know, "rendering" refers to the process of generating a final digital product from specific input. The output is, as is the case with the present invention, a digital image or raster graphics image file. Many rendering algorithms exist, and the techniques involved typically fall into three categories or techniques. Rasterization, including scanline rendering, geometrically projects objects in the scene to an image plane, without advanced optical effects. Ray Casting considers a scene from a particular point of view, calculating the observed image based only on geometry and, typically, basic optical laws of reflection intensity. Ray Tracing is similar to Ray Casting, but employs more advanced optical simulation and frequently uses Monte Carlo techniques to obtain more realistic results quickly. Additional techniques are also used. However, although the present invention involves rendering images, the particular techniques used to accomplish that are not germane to the invention.

As used herein, the terms "computing unit" and "computing device" refer to any device with a processor or processing circuit and either a memory with code stored therein or a special-purpose electronic circuit, in order to accomplish one or more aspects of the invention. Examples of a computing device include a desktop computer, laptop computer and a smartphone, as generally described with respect to FIG. 7.

As used herein, the term "short-range wireless protocol" includes current and future such protocols, for example, WiFi (IEEE 802.11 a/b/g/n/ac), Bluetooth (IEEE 802.15.1), Bluetooth LE, Near-Field Communication (NFC), Infrared, Ultra-Wide Band (UWB), RF ID, etc.

As used herein, the phrase "instant photography mode" refers to one or more settings of an application, app, etc. that causes gradual rendering, as defined herein, of a digital image.

As used herein, the terms "characteristic" and "characteristics" when used with a digital image refers to visual characteristics of the digital image, for example, balance, brightness, exposure, contrast, highlights/shadows, shading, saturation, tint, temperature, sharpness, pixelization, visual texture, etc. Further, the use of "relative", in the phrase "relatively low" when used with a characteristic of a digital image, means relative to the received level of that characteristic in the digital image and is less than or equal to a minimum level of that characteristic that is perceptible to an average user, down to no or zero level of that characteristic (necessarily not perceptible). In one example, a "relatively low" level of a characteristic may be about 5% or less of the received level of that characteristic.

Referring to the drawings in detail, with particular reference to FIG. 1, an aspect of the present invention includes a system 100 that may be used to implement methods for recreating an instant analog print developing experience, wherein analog film develops before a user's eyes, in the context of a digital photo. Hence, for example, such an experience does not apply to e.g., 35 mm print developing or single use analog cameras where the prints develop in a lab or similar facility, or otherwise are not developed before a user's eyes. Other aspects of the present invention will be discussed in more detail below.

As best seen in FIG. 1, system 100 may include one or more computing devices, at least some of which are in communication with a network 5 via a wired connection or a wireless connection. The computing devices in system 100 that have connections to network 5 include user computing devices (e.g., first, second, and third computing devices 30, 50, and 60 of users 1, 2, and 3, respectively) and at least one server 70. Each of user computing devices 30, 50, 60 and the server 70 may include a processor and a memory, which may have various programs, applications, logic, algorithms, instructions, stored therein. As such, the system and methods described herein are not limited to any specific hardware or software configuration, but may rather be implemented as computer executable instructions in any computing or processing environment, including in digital electronic circuitry or in computer hardware, firmware, device driver, or software. For example, user computing devices 30, 50, 60 may be mobile computing devices (e.g., smartphones or tablets), portable computers (e.g., laptops), stationary computers (e.g., desktop PCs), or various other similarly configured electronic devices including processors, memories, and network connectivity. One or more of user computing devices 30, 50, 60 and/or server 70 may be programmed with computer executable instructions for recreating an instant analog print developing experience as described herein. Although three user computing devices 30, 50, and 60 are shown in FIG. 1, it should be understood that this is illustrative only and system 100 may include any number of user computing devices.

User computing devices 30, 50, 60 may be configured to download or otherwise access at least one application 40 via network 5. Among various other features and functions, application 40 enable users to view digital images 25 received from remote computing devices using their respective computing devices, as well as provide a specialized digital image rendering method according to example embodiments described herein. Application 40 may be a mobile application ("App") or client desktop application, for example, or any other application to which digital images can be transferred. Application 40 may be stored on and obtained from server 70 in some example embodiments, or a dedicated App store (e.g., APPLE (mac OS, iOS and/or iPad OS), ANDROID, WINDOWS, etc.) as known in the art. Application 40 could also be a web-based application that is accessed using a browser, for example. Application 40 may include messaging applications (e.g., text/SMS, chat, e-mail, etc.), applications associated with social media sites (e.g., FACEBOOK, INSTAGRAM, etc.), online photo sharing services (e.g., GOOGLE PHOTOS, etc.), or any other application which can receive and display a digital image shared by another user using their respective computing device. In the case of messaging applications 40, users 1, 2, 3 may share digital images 25 with one or more other users directly by transmitting/receiving them between their respective computing devices 30, 50, 60 via network 5. In the case of social media applications 40, users 1, 2, 3 may share digital images 25 with one or more other users indirectly by posting them to the respective social media site to the user's profile, page, news feed for viewing by other users of the social media sites. In addition, server 70 may also store digital images 25 that are communicated from user computing devices via network 5. In some example embodiments, user computing devices 30, 50, 60 may retrieve digital images 25 of other users from server 70 via network 5. Accordingly, server 70 may provide various digital image sharing and storage services, including but not limited to a remote cloud storage service, an online photo sharing service, a messaging service (e.g., text/SMS, email), and/or a social media service, to users 1, 2, 3 of computing devices 30, 50, 60. Although one server 70 is shown in FIG. 1, there could be multiple different servers for different applications 40, or for performing different functions depending on application type, for example.

In one example, detecting that the digital image is representative of a physical analog print may be accomplished, for example, using image recognition or computer vision via computer readable instructions or, as another example, by detecting metadata associated with the digital image (e.g., an EXIF tag) received, as explained in more detail subsequently. For example, a social media or photo sharing site could allow an image to be "tagged" in the metadata, such that an application, for example, receiving the digital image recognizes the metadata tag to indicate that the digital image is a representation of an analog instant photo, such that the digital image is gradually rendered over a predetermined time.

Computer Vision is a branch of artificial intelligence (AI). More specifically, computer vision is a set of techniques allowing the automation of tasks from an image or video stream. Image recognition is a subset of computer vision. It consists of a set of techniques for detecting, analyzing, and interpreting images to favor decision-making. It works through a neural network trained via an annotated datasheet. The purpose of image recognition is similar to that of computer vision, i.e. to automate the performance of a task. In image recognition, these tasks are varied. For instance, they can be the labeling of an image through tagging, the location of the main object of an image, or guiding an autonomous car. Beyond that is image classification, object detection, segmentation or tagging.

In addition to user computing devices 30, 50, 60 and server 70, system 100 may also include other devices for capturing photographs, including but not limited to an instant camera 10 (e.g., FUJIFILM INSTAX, etc.) and a digital camera 20. Instant camera 10 produces analog instant photographs 15 (actual physical photos), whereas digital camera 20 produces digital images 25 (electronic photos). In some example embodiments, digital camera 20 is a separate and distinct electronic device from user computing devices 30, 50, 60 It should be appreciated that various known means of transferring digital images 25 from digital camera 20 to user computing device 30, may be used, including but not limited to a wired connection, a wireless connection, a memory card, or a remote server device (e.g., an online cloud storage service or photo sharing service), for example. In other example embodiments, digital camera 20 may instead be an integrated component of one or more of the user computing devices (including, but not limited to, a smartphone camera or a tablet camera, or a webcam of a laptop computer or desktop PC, for example), such that digital images 25 captured by digital camera 20 are stored on the user computing device 30 and no transfer operation is needed.

In some example embodiments, application 40 may include, or work in association with, computer executable instructions that include a trigger for performing gradual rendering for recreating an instant analog print developing experience for digital photos, as described in detail below in connection with FIGS. 2, 3, and 4. In one example, gradual rendering can be a service that is accessed, for example, by the application. According to one example embodiment, the trigger in method 300 of FIG. 3 (refer to step S235) is the step of detecting that a digital image being shared is a picture of an analog instant photograph by using image recognition or computer vision software integrated in the computer executable instructions. According to another example embodiment, the trigger in method 400 of FIG. 4 (refer to step S435) is the utilization of an "instant photography" mode built into the application settings. In yet another example, the analog instant print may be converted to digital using any number of known scanning methods and the application can treat the digital conversion as the trigger to treat the digital image as an analog instant photo in terms of development of the digital image over a predetermined time. In one example, the application setting may be user implemented. In another example, the user cannot choose the setting and "instant photography" is implemented as a non-user-configurable feature, for example, via a "share instant print" button or the like. In either case, when the trigger is initiated, the computer executable instructions operate to perform a slow or gradual rendering (hereinafter "gradual rendering") of the subject digital image to emulate the development of an analog film print from an instant camera. In one example, the application can control whether the gradual rendering is done every time a user views it or, for example, just the first viewing by the user. The gradual rendering of a digital image includes intentionally delaying the rendering of the digital image over a predetermined time so that the digital image slowly progresses on a display of a computing device from an invisible (or barely visible) image to a fully rendered digital image. The methods described herein may include the ability for the user of application 40 to selectively enable/disable (turn on/off) the gradual rendering using the respective computing device. The methods described herein may include the ability for the user of application 40 to change the predetermined amount of time over which a digital image is gradually rendered, or to modify the particular manner in which the gradual image rendering process occurs, during operation of the methods described herein, using their respective computing devices.

Next, one example of a method for rendering a digital image to recreate an instant analog print developing experience for digital photos will be described with reference to the flowchart showing method 200 in FIG. 2. Then, two different variations of the example method will be described with reference to the flowcharts showing method 300 in FIG. 3 and method 400 in FIG. 4, respectively.

Figure 2:
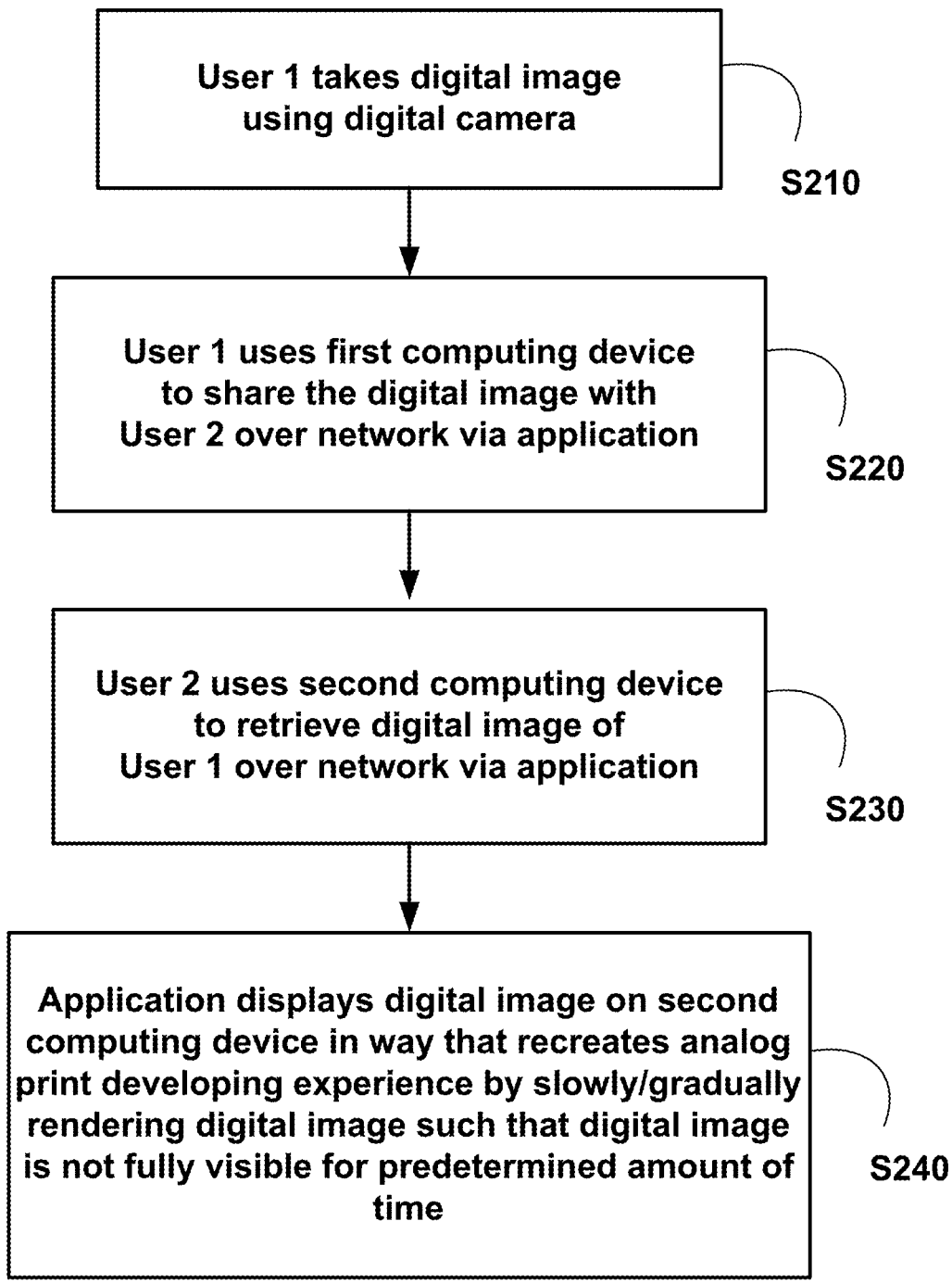
FIG. 2 is a flow chart corresponding to a method for recreating an instant analog print developing experience for digital photos, in accordance with an aspect of the present invention.

As shown in FIG. 2, method 200 begins with user 1 taking a photograph using digital camera 20 at step S210, and then user 1 uses first computing device 30 to share the resulting digital image 25 with user 2 over network 5 via application 40 at step S220.

In some example embodiments, digital image 25 is a picture of a physical analog instant photograph 15, which was produced using instant camera 10. Once the resulting analog instant photograph 15 has developed, user 1 takes the photograph of the physical analog instant photograph 15 with digital camera 20 to produce digital image 25. In some other example embodiments, digital image 25 can be any digital photograph with any content (and is not limited to a digital photo of an analog instant photograph 15 or other physical photo, specifically). As mentioned above, digital image 25 may be produced using digital camera 20 that can be an independent device (image transfer step needed) or an integrated component of user computing devices 30, 50, 60 (no image transfer step required).

Method 200 continues with user 2 using second computing device 50 to retrieve digital image 25 over network 5 from user 1 via application 40 at step S230. Then, at step S240, application 40 displays digital image 25 on second computing device 50 in way that recreates an instant analog print developing experience for user 2 by gradually rendering digital image 25 such that digital image 25 is not fully visible, or has a characteristic of the digital image set to a zero level or a relatively low level, for a predetermined amount of time. The predetermined amount of time corresponds to the time it takes for a physical analog instant photograph to develop (e.g., such as 10 seconds, 20 seconds, 30 seconds, 60 seconds, or 90 seconds, for example), and this value could be a pre-set default value or a user-entered custom value that can be set and changed as desired in the settings of application 40 so that the image rendering can be slower, faster, more or less gradual.

Figure 3:
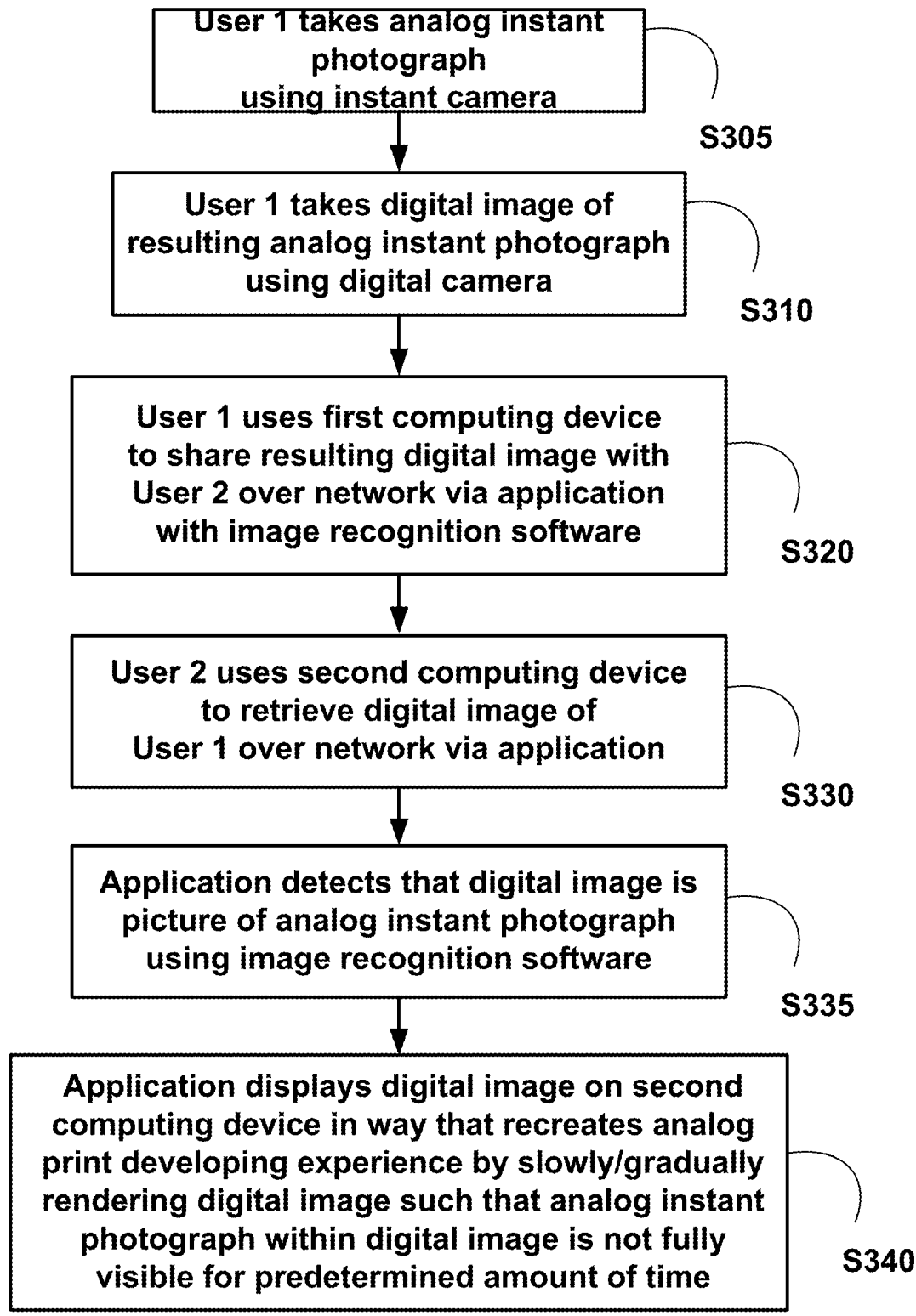
FIG. 3 is a flow chart corresponding to a method for recreating an instant analog print developing experience for digital photos, in which an application utilizes image recognition software, in accordance with another aspect of the present invention.
Figure 4:
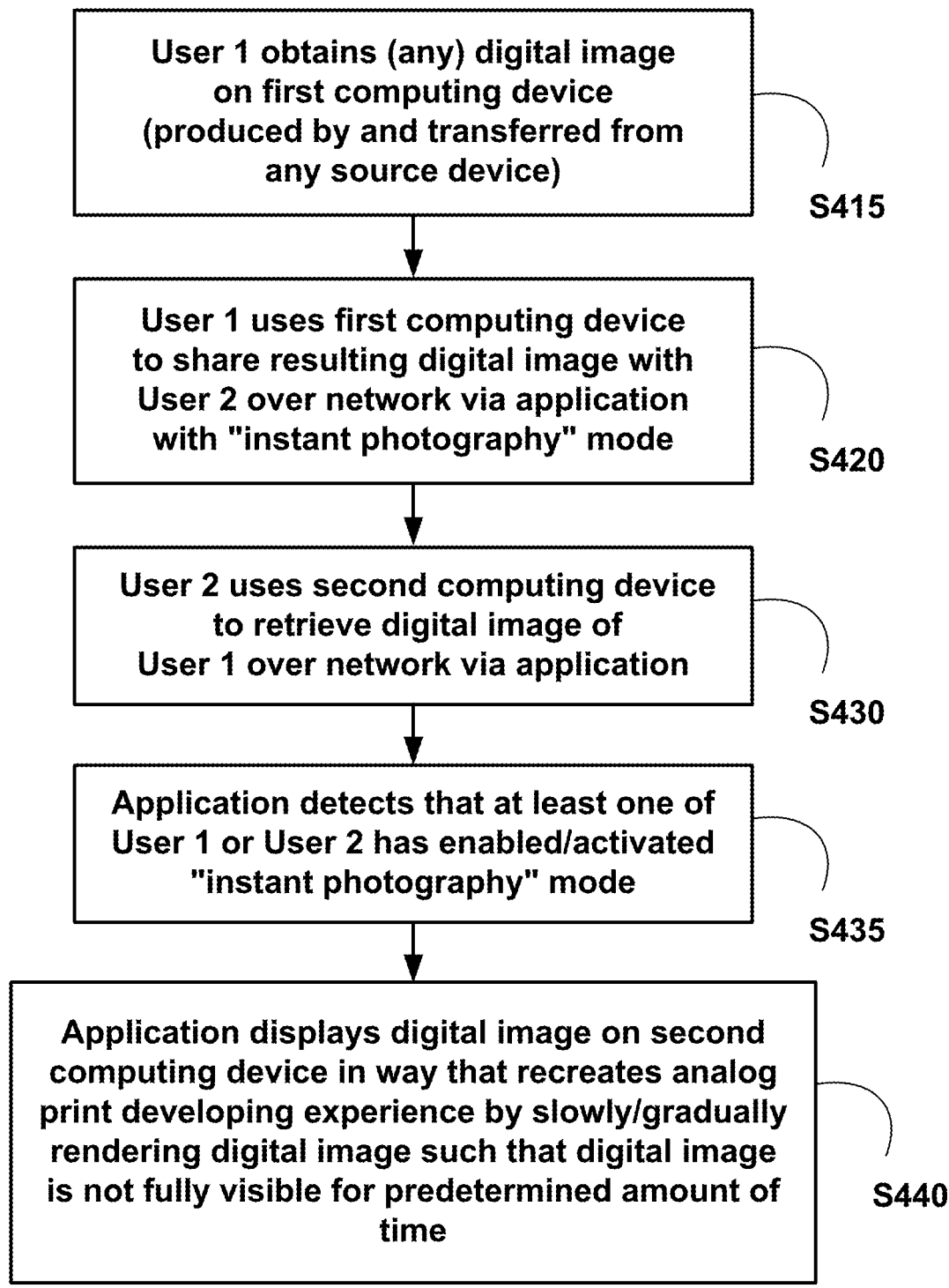
FIG. 4 is a flow chart corresponding to a method for recreating an instant analog print developing experience for digital photos, in which an application has an "instant photography" mode, in accordance with yet another aspect of the present invention.

Additionally, it should be understood that in methods 200, 300, and 400 of FIGS. 2, 3, and 4, digital image 25 can be shared directly (e.g., transmitted and received using a text/SMS message, a web chat window, an e-mail, an instant direct transfer when computing units are physically close using, for example, a short-range communications protocol, etc.) between user computing devices in the case of a messaging application 40, or digital image 25 may be shared indirectly (e.g., posted to a user's profile, page, or news feed, for example) between user computing devices with transmission to, storage by, and retrieval from server 70 in the case of a social media application, according to different example embodiments. In either case, one or more user computing devices may have a mobile application 40 and/or one or more user computing devices may have a desktop application 40, depending on the specific type of device each user has.

As shown in FIG. 3, method 300 begins with user 1 taking a photograph using instant camera 10 at step S305, and then after a physical analog instant photograph 15 is fully developed, user 1 takes a digital photograph of the resulting analog instant photograph 15 using digital camera 20 at step S310. Then, user 1 uses first computing device 30 to share the resulting digital image 25 of analog instant photograph 15 with user 2 over network 5 via application 40 at step S320. In this example embodiment, application 40 has image recognition software 44 integrated therein.

Image recognition software 44 is configured to analyze digital image 25 and recognize when a digital image 25 is a picture of a physical analog instant photograph. For example, image recognition software 44 may detect that the content depicted in the digital image has a certain shape (e.g., square or rectangular), certain outer dimensions (e.g., corresponding to the sizes of typical physical analog instant photos), is surrounded by a border (e.g., a white border around the image in the photo) having a certain width, or combinations thereof. Analog instant photography prints have well-defined borders. The borders do not have to be white. For example, the borders of the instant prints could come with a variety of different colors, designs and/or images. However, the size and shape of the borders are well-defined.

Method 300 continues with user 2 using second computing device 50 to receive digital image 25 from user 1 (e.g., user 1 literally sending the digital image or user 2 downloading the digital image) over network 5 via application 40 at step S330. In this example embodiment, application 40 is configured to detect whether a digital image being shared is a picture of an analog instant photograph using image recognition software 44 at step S335. Based on detecting that digital image 25 is a picture of analog instant photograph 15 via image recognition software 44, at step S340, application 40 displays digital image 25 on second computing device 50 in way that recreates an instant analog print developing experience for user 2 by gradually rendering digital image 25 such that analog instant photograph 15 within digital image 25 is not fully visible for a predetermined amount of time (see non-limiting example times set forth above, which may be pre-set by default or user-adjustable).

As shown in FIG. 4, method 400 begins with user 1 obtaining any type of digital image 25 (from an analog instant photo, a developed (non-instant) photo, or an original digital image) on first computing device 30 at step S415, and then user 1 uses first computing device 30 to share digital image 25 with user 2 over network 5 via application 40 at step S420. In this example embodiment, digital image 25 may be produced by any camera and transferred from any source device, and application 40 is configured to include an "instant photography" mode 48 built into its settings or otherwise integrated via plug-in software component (also referred to as an add-on or extension), for example. In one example, implementing the gradual rendering may be accomplished by an app/application, for example, a social media application and/or a messaging application. In another example, a developer creates an application plug-in, add-on, extension or API that is made available to the social media application and/or the messaging application, or made available to users (e.g., for downloading) in one or more app/application stores.

Instant photography mode 48 may be selectively enabled/activated and disabled/deactivated by users 1, 2, 3 on their respective computing devices 30, 50, 60. In some example embodiments, the user sharing a digital image via application 40 can activate instant photography mode 48, such that any other users receiving and viewing the digital image of that particular user via application 40 will experience instant analog print developing of the digital image on their respective computing devices unless any of those other users have instant photography mode 48 disabled/deactivated or do not have (could prompt to get a plug-in, for example). In some other example embodiments, the user receiving and viewing a digital image via application 40 can enable/activate instant photography mode, such that this particular user will experience the instant analog print developing of any digital images shared by any other users. In this example embodiment with instant photography mode 48, the original image can be any digital photograph or picture obtained from any source device, and the content of digital image 25 does not have to be a picture of a physical analog instant photograph although it could be such a photo in this example as well.

Method 400 continues with user 2 using second computing device 50 to retrieve digital image 25 of user 1 over network 5 via application 40 at step S430. In this example embodiment, application 40 is configured to detect whether at least one of user 1 or user 2 has enabled/activated the "instant photography" mode 48 of application 40 at step S435. In response to detecting that either user 1 transmitted digital image 25 with instant photography mode 48 of application 40 enabled/activated on first computing device 30, or user 2 receive digital image 25 with instant photography mode 48 of application 40 enabled/activated on second computing device 50, at step S440, application 40 displays digital image 25 on second computing device 50 in a way that recreates an instant analog print developing experience for user 2 by gradually rendering digital image 25 such that digital image 25 is not fully visible for a predetermined amount of time.

For example, the transmitting user (e.g., user 1) can select to enable/activate instant photography mode 48 of application 40 on first computing device 30 when sharing digital images 25 with other users. Additionally or alternatively, the receiving user (e.g., user 2) can select to enable/activate instant photography mode 48 of application 40 on second computing device 50 when retrieving or receiving digital images 25 of other users. Similar steps as described above for user 2 and second computing device 50 also apply for a user 3 and a third computing device 60, and any additional user/device pairs as desired or that may be applicable for various different image-sharing scenarios. However, it is also possible that even where user 1 has enabled/activated instant photography mode 48, another user 2, 3 may have disabled/deactivated instant photography mode 48 on their respective computing device 50, 60, in which case a normal image rendering process would be performed for the other user when viewing the digital image on their computing device (instead of the specialized slow/gradual image rendering process). This flexibility will allow any given user 1, 2, 3 of application 40 the option to choose whether or not digital images 25 that users transmit/receive will be slowly/gradually rendered on their respective computing devices 30, 50, 60 according to the methods described herein.

According to another aspect of the present invention, in the case where application 40 is associated with a social media site, and user 1 shares digital image 25 with one or more other users 2, 3 by posting it to the social media site using first computing device 30, social media application 40 would exhibit similar behavior as a messaging application 40 for displaying digital image 25 using the specialized slow/gradual image rendering service described above for the other users 2, 3 of the social media site on each of the other users computing devices 50, 60, for the first time that each respective user browses and views that particular digital image 25 on the social media site via application 40. However, once a particular digital image 25 has been browsed and viewed by a given user on the social media site for the first time, the second time (and each subsequent time) that same user browses and views the same digital image 25 again, it will be fully rendered as soon as it is displayed on that user's computing device. Therefore, once digital image 25 is browsed by user 2 on the social media site using application 40 and is gradually rendered on second computing device 50, that same digital image 25 will always be displayed to user 2 fully rendered on second computing device 50. Similarly, if that same digital image 25 is browsed by user 3 on the social media site using application 40 and is gradually rendered on third computing device 60, that same digital image 25 will always be displayed to user 3 fully rendered on third computing device 60, and so on for additional users and computing devices accessing the same digital image 25 on the social media site. Note that this additional example embodiment is similarly applicable in any of the methods 200, 300, and 400 described above with reference to FIGS. 2, 3, and 4.

Non-limiting examples of processing a color digital image, illustrating a specialized slow/gradual image rendering process in accordance with one or more aspects of the present invention, will now be described with particular reference to FIGS. 5 and 6.

Figure 5:
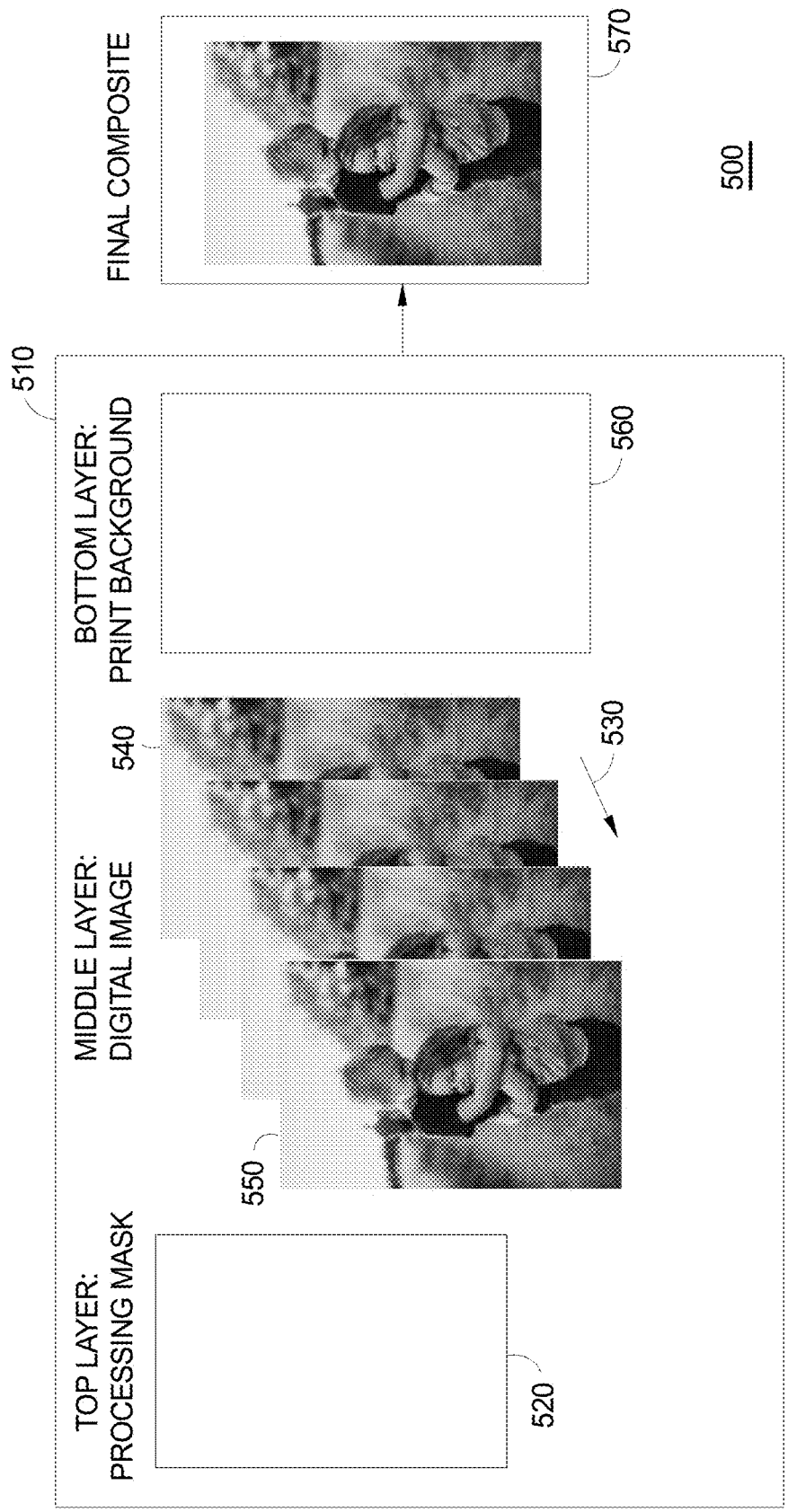
FIGS. 5, 6 and 7 show examples of a slow/gradual digital image rendering process in accordance with one or more aspects of the present invention.

FIG. 5 is a modified flow diagram 500 for processing a color digital image by gradually rendering the same over a predetermined time, in accordance with one or more aspects of the present invention. Although FIG. 5 shows a color digital image and refers to saturation as the digital image characteristic used to gradually render the digital image, it will be understood that one or more other characteristics (a different characteristic or multiple characteristics together) can be used. Returning to FIG. 5, the gradual rendering process 510 begins with, for example, a processing mask 520 where no portion of the digital image is viewable by a user. In this example, the processing mask is white, however, it will be understood that it could be some other color (e.g., gray). However, the mask should be opaque initially. The gradual rendering then shows to the user, for example, a series 530 of changes with regard to the characteristic from an unsaturated state 540 to a fully saturated state 550. In one example, the unsaturated state may be faded with no or relatively low saturation (color). In another example, the unsaturated state may be grayscale. A background bottom layer 560, which may be shown, for example, as static to the user throughout the gradual rendering, may take the form of an outer border of the digital image. In another example, the background does not show until the gradual rendering is complete. In still another example, the background bottom layer could gradually be rendered along with the digital image when processing is complete, the final composite image 570 is seen by the user, including the background layer and the fully saturated digital image. Although the example of FIG. 5 uses both a mask and gradual rendering of the digital image in terms of the relevant characteristics, it will be understood that, for example, the mask alone could be used and gradually transition over the predetermined time period from opaque to transparent.

Figure 6:
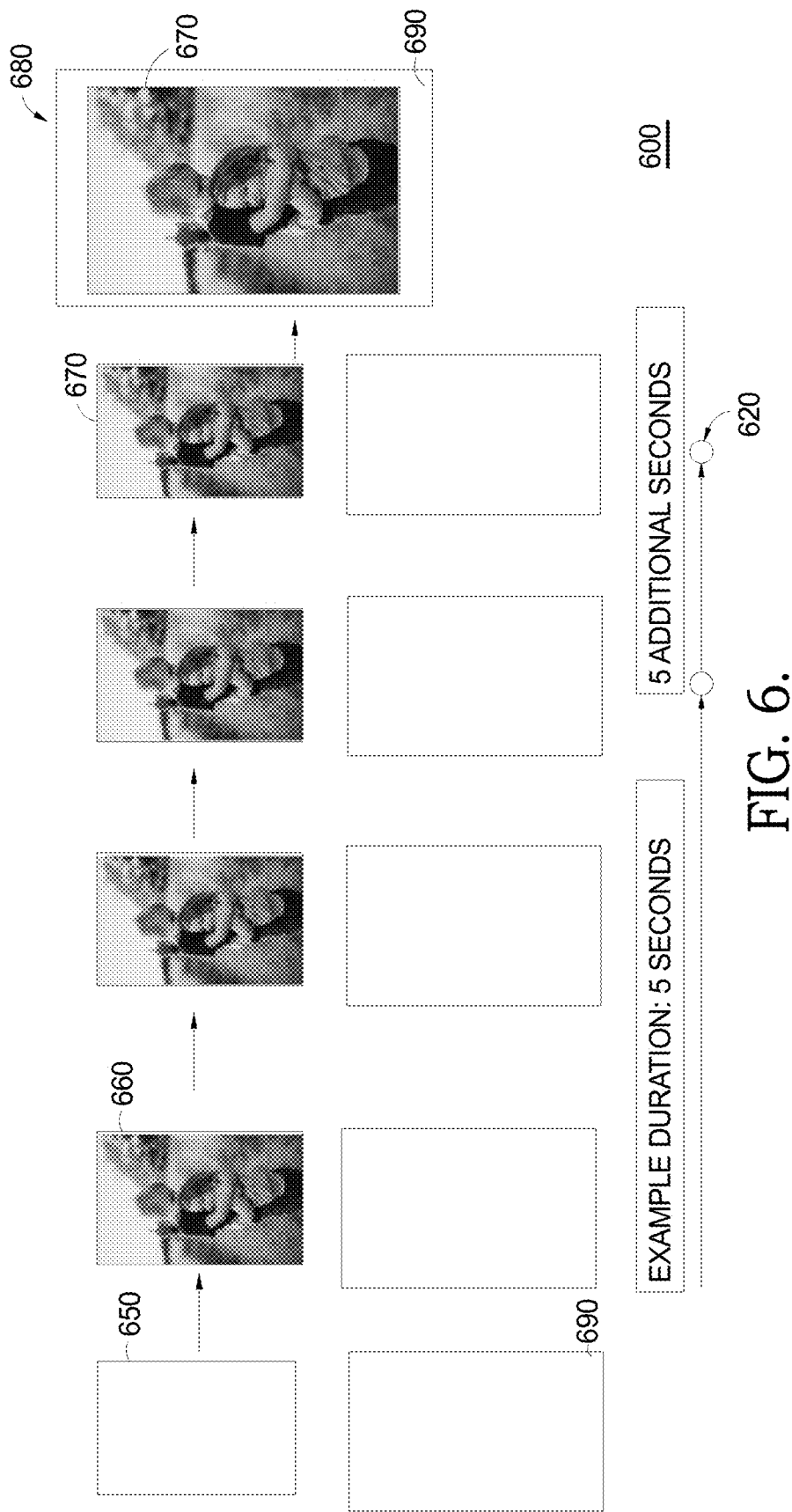

FIG. 6 is a modified flow diagram 600 of another example of processing a color digital image by gradually rendering the same over a predetermined time, in accordance with one or more aspects of the present invention. FIG. 6 is similar to FIG. 5 in terms of gradually rendering the digital image via color, but includes example transitions 610 for the mask layer and an example timeline 620. The mask layer, in one example, may transition from a solid color (e.g., dark gray) 630 to a lighter solid color 640 (e.g., tan) and finally to clear/transparent 650, such that the digital image is seen and the mask layer is no longer viewable. As with FIG. 5, the gradual rendering of the digital image may transition from an unsaturated or relatively low saturation state 660 to a fully saturated state 670 over a predetermined time, for example, 10 seconds as shown using timeline 620. The final image 680 includes the fully saturated digital image 670 and the background border 690.

Figure 7:
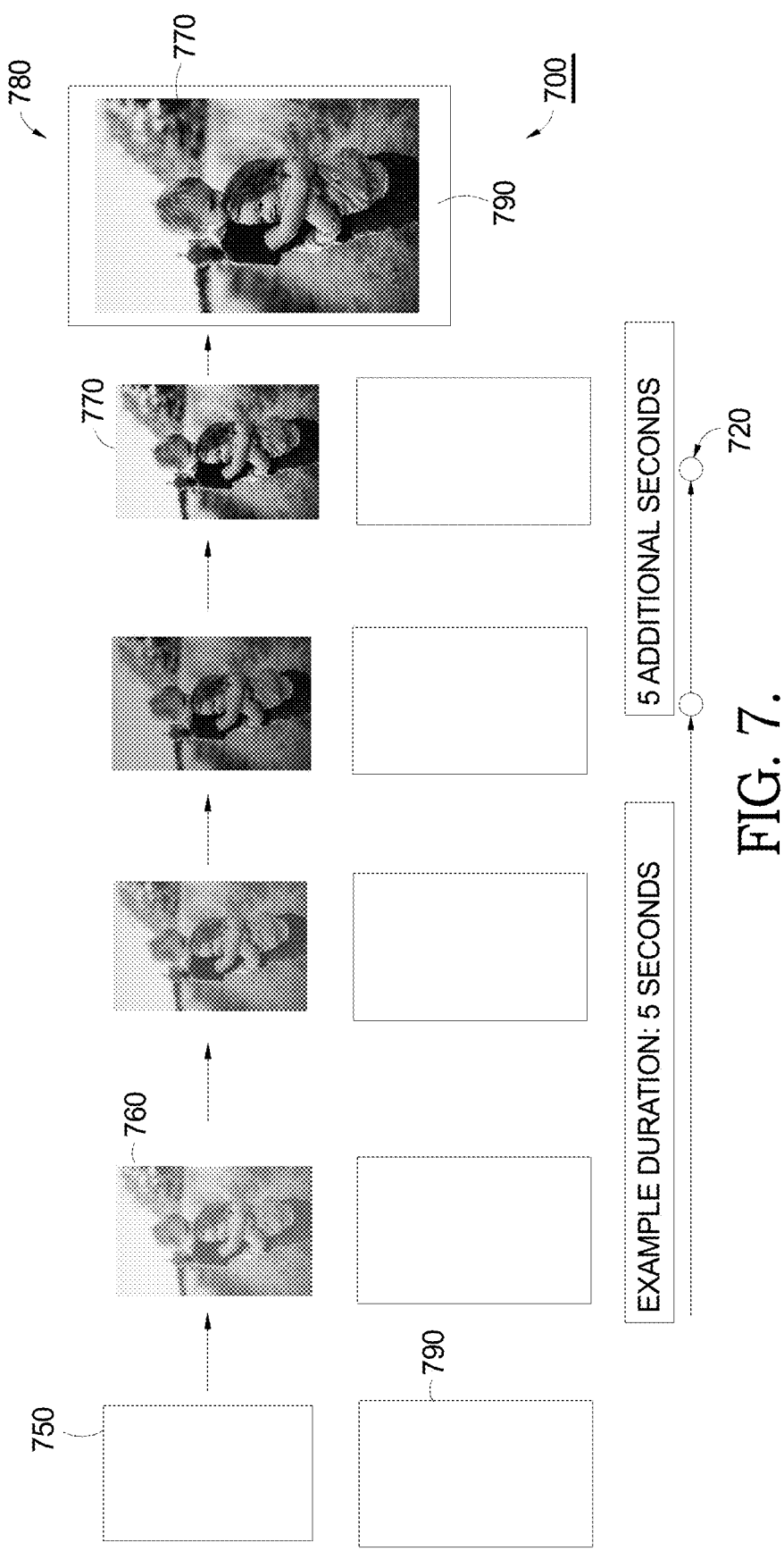

FIG. 7 is a modified flow diagram 700 of an example of gradually rendering over a predetermined time with the characteristic being contrast, in accordance with one or more aspects of the present invention. FIG. 7 is similar to the flow in FIG. 6 in terms of gradually rendering based on a characteristic of a photograph, except the example characteristic used is contrast rather than color. FIG. 7 includes an example mask layer 750 and an example timeline 720. The mask layer in one example may transition from opaque (e.g., white) to transparent, such that the digital image is seen with more contrast. The digital image gradual rendering in this example transitions from a relative low (relative to the received image) or no contrast state 760 to a full contrast state 770 over a predetermined time, for example ten seconds as shown in the timeline 720. The final, full-contrast image 780 includes full-contrast image 770 and the background 790. In the present example, the background remains white or just an outline throughout the gradual transition. However, as noted previously, the background could be for ex, a different color, design, etc.

According to other aspects of the present invention, several variations of the rendering service described above with reference to methods 200, 300, and 400 of FIGS. 2, 3, and 4 (refer to steps S240, S340, and S440) will be described next.

In a first variation of the rendering service, at step(s) S240, S340, and/or S440, only an image that is displayed in the physical analog instant photograph 15 (i.e., the actual picture content itself) within digital image 25 is gradually rendered to recreate the instant analog print developing experience, while the surrounding areas of the image (e.g., a white square or rectangular shaped border, and/or anything outside of that border that may have been captured in digital image 25 of analog instant photograph 15) are fully rendered as soon as digital image 25 is displayed on second computing device 50 (or third computing device 60).

In a second variation of the rendering service, at step(s) S240, S340, and/or S440, the entire image displayed in digital image 25 is gradually rendered, including the actual content of the picture as well as any surrounding areas captured in the digital image, such as in the case of a border around the perimeter of the image when digital image 25 is a picture of a physical analog instant photograph 15.

In a third variation of the rendering service, at step(s) S240, S340, and/or S440, the entire digital image 25 slowly/gradually appears relatively evenly or uniformly or consistently throughout the image, with increasing clarity and detail, until the fully developed image is present. In a fourth variation of the rendering service, at step(s) S240, S340, and/or S440, digital image 25 is slowly/gradually rendered in a "top-down" manner, such that a fully developed image starts appearing from the top of digital image 25 and continues down to the bottom of digital image 25 (rather than with increasing detail in a relatively even/uniform/consistent manner across the entire image) over the predetermined amount of time. Similarly, in additional modifications of the fourth variation of the rendering service, the slow/gradual image rendering process could be performed in a "bottom-up" manner (fully developing starting from the bottom of the image and ending at the top of the image) or other like manner where different portions of the digital image develop in sequence or at different rates, such as left-to-right, right-to-left, inside-out, outside-in, corner-to-corner, etc. The particular manner in which the specialized slow/gradual rendering process occurs may be pre-set by default, may vary randomly among available options (e.g., to create additional interest in how images are revealed when shared and viewed by users), may be user-selected according to their own preferences from among the available options, etc. in various different example embodiments.

In yet further variations, the slow/gradual image rendering process that occurs during the predetermined amount of time may transition from darker to lighter, blurry to focused, black/white to color, or may reveal pixel patterns forming different shapes or designs as the digital image is being displayed, or may utilize various other possible computer-implemented image rendering techniques designed to accurately replicate the instant analog print developing experience that occurs while physical analog instant photos are developing.

In a first aspect, the present invention provides a system for rendering a digital image. The system includes a first computing device, including a method programmed in a memory for execution by a processor in a computing environment for rendering a digital image. The method includes receiving a digital image at the first computing device from a source over a network, the digital image including one or more characteristics, each of the characteristics having a received level. The method further includes detecting whether the digital image is to be gradually rendered over a predetermined time in order to provide a user with a simulated experience of instant analog print developing. Based on the detecting, the method includes gradually rendering the digital image on a display associated with the first computing device over the predetermined time, the gradually rendering including increasing a level of the characteristic(s) until the level reaches the received level corresponding thereto.

In one example, the method performed by the system includes the source including a second computing device and the receiving includes directly receiving, by the first computing device, the digital image from the second computing device. In another example, the directly receiving includes the first computing device and the second computing device using a messaging application. In a further example, the directly receiving includes using a short range communications protocol.

In one example, the method performed by the system includes the source including a server associated with a social media site and the first computing device receives the digital image after a request to download the digital image is made using the first computing device.

In another example, the method performed by the system includes the source including a server associated with a photo sharing site and the first computing device receives the digital image after a request to download the digital image is made using the first computing device.

In still another example, the method performed by the system includes the digital image being an image of a physical analog instant print, the physical analog instant print including a picture portion and an outer border portion surrounding the picture portion. In one example, the gradually rendering includes gradually rendering the picture portion over the predetermined time, the method further including rendering the outer border portion normally. In another example, the gradually rendering includes gradually rendering the picture portion and the outer border portion over the predetermined time. In yet another example, the detecting may be performed by computer executable code configured for image recognition.

In one example, the method performed by the system includes the source including a second computing device sending the digital image to the first computing device over the network using an application, the application including an instant photography mode in one or more settings of the application.

In one example, the gradually rendering includes gradually rendering a masking layer over the digital image, the masking layer being initially opaque such that the digital image cannot be seen by the user; and decreasing opacity of the masking layer over the predetermined time until the masking layer is transparent. In another example, the source includes a second computing device and the receiving includes directly receiving, by the first computing device, the digital image from the second computing device. In a further example, the directly receiving includes the first computing device and the second computing device using a messaging application.

In one example, the digital image includes a color digital image, the one or more characteristics includes saturation and the gradually rendering includes initially rendering the color digital image as unsaturated or having relatively low saturation; and gradually increasing the saturation over the predetermined time until the saturation reaches the received level of saturation of the color digital image.

In one example, the digital image lacks color (e.g., gray scale or black and white), the one or more characteristics includes contrast, the predetermined time includes a first predetermined time and a second predetermined time and the gradually rendering includes initially rendering the digital image with a relatively low contrast or with no contrast over the first predetermined time; and gradually increasing the contrast over the second period of time until the contrast of the digital image reaches a corresponding received level of contrast.

In one example, a digital image of the method performed by the system is associated with metadata, the metadata including a tag. In addition, the detecting includes recognizing the tag, the tag indicating that the digital image is a representation of an analog instant photo.

In a second aspect, the present invention provides a method programmed in a memory for execution by a processor in a computing environment for rendering a digital image. The computing environment includes a first computing device and the method includes receiving a digital image at the first computing device from a source over a network. The digital image includes one or more characteristics, each of the one or more characteristics having a received level. The method further includes detecting whether the digital image is to be gradually rendered over a predetermined time in order to provide a user with a simulated experience of instant analog print developing; and, based on the detecting, gradually rendering the digital image on a display associated with the first computing device over the predetermined time, the gradually rendering including increasing a level of at least one of the characteristic(s) until the level reaches the received level corresponding thereto.

In one example, the source of the method includes a second computing device and the receiving includes directly receiving, by the first computing device, the digital image from the second computing device. In one example, the directly receiving, by the first computing device, includes the first computing device and the second computing device using a messaging application. In another example, the directly receiving includes using a short range communications protocol.

In one example, the source of the method includes a server associated with a social media site and the first computing device receiving the digital image after a request to download the digital image is made using the first computing device.

In one example, the source of the method includes a server associated with a photo sharing site and the first computing device receives the digital image after a request to download the digital image is made using the first computing device.

In an example, the predetermined time of the method aspect includes a first predetermined time and a second predetermined time that the digital image is an image of a physical analog instant photo the physical analog instant photo including a picture portion and an outer border portion surrounding the picture portion. In one example, the gradually rendering includes gradually rendering the picture portion and rendering the outer border portion normally. In another example, the gradually rendering includes gradually rendering the picture portion and the outer border portion. In a further example, the detecting may be performed using by computer executable code configured for image recognition.

In one example, the method aspect includes the source including a second computing device sending the digital image to the first computing device over the network using an application, the application including an instant photography mode in one or more settings of the application.

In one example, the gradually rendering of the method aspect includes rendering a masking layer over the digital image, the masking layer being rendered as initially opaque such that the digital image cannot be seen by the user; and gradually decreasing opacity of the masking layer over the predetermined time until the masking layer is transparent.

In another example, the source of the method aspect includes a second computing device and wherein the receiving comprises directly receiving, by the first computing device, the digital image from the second computing device.

In yet another example, the directly receiving of the method aspect includes the first computing device and the second computing device using a messaging application.

In a further example, the digital image of the method aspect includes a color digital image, the one or more characteristics includes saturation and the gradually rendering includes initially rendering the color digital image as unsaturated or with relatively low saturation; and gradually increasing the saturation over the predetermined time until the saturation reaches the received level of saturation of the color digital image.

In another example, the predetermined time of the method aspect includes a first predetermined time and a second predetermined time and the digital image lacks color (e.g., gray scale or black and white), the one or more characteristics including contrast and the gradually rendering includes initially rendering the digital image with no contrast or with relatively low contrast over the predetermined first time; and gradually increasing the contrast over the second period of time until the contrast of the digital image reaches the received level of contrast.

In one example, the digital image of the method aspect is associated with metadata, the metadata including a tag. The detecting includes recognizing the tag, the tag indicating that the digital image is a representation of an analog instant photo.

In a third aspect, the present invention provides a non-transitory program product storing thereon processor-executable instructions for performing a method. The method includes receiving a digital image at a first computing device from a source over a network, the digital image including one or more characteristics, each of the one or more characteristics having a received level. The method of the program product also includes detecting whether the digital image is to be gradually rendered over a predetermined time in order to provide a user with a simulated experience of instant analog print developing. Based on the detecting, the digital image is gradually rendered on a display associated with the first computing device over the predetermined time, the gradually rendering including increasing a level of at least one of the one or more characteristics until the level reaches the received level corresponding thereto.

In one example, the method of the program product aspect includes the source including a second computing device and the receiving including directly receiving, by the first computing device, the digital image from the second computing device. In one example, the directly receiving includes the first computing device and the second computing device using a messaging application. In another example, the directly receiving includes using a short range communications protocol.

In another example, the method of the program product aspect includes the source including a server associated with a social media site and the first computing device receiving the digital image after a request to download the digital image is made using the first computing device.

In still another example, the method of the program product aspect includes the source including a server associated with a photo sharing site and the first computing device receiving the digital image after a request to download the digital image is made using the first computing device.

In a further example, the method of the program product aspect includes the digital image being an image of a physical analog instant print, the physical analog instant print including a picture portion and an outer border portion surrounding the picture portion. In one example, the gradually rendering includes gradually rendering the picture portion over the predetermined time and rendering the outer border portion normally. In another example, the gradually rendering includes gradually rendering the picture portion and the outer border portion over the predetermined time. In still another example, the detecting is performed by computer executable code configured for image recognition.

In one example, the method of the program product aspect includes the source including a second computing device sending the digital image to the first computing device over the network using an application, the application including an instant photography mode in one or more settings thereof.

In one example, the method of the program product aspect includes the gradually rendering including rendering a masking layer over the digital image, the masking layer being initially opaque such that the digital image cannot be seen by the user, and decreasing opacity of the masking layer over the predetermined time until the masking layer is transparent. In another example, the source includes a second computing device and the receiving includes directly receiving, by the first computing device, the digital image from the second computing device. In still another example, the directly receiving includes the first computing device and the second computing device using a messaging application.

In one example, the digital image of the method of the program product aspect includes a color digital image, the one or more characteristics includes saturation and the gradually rendering includes initially rendering the color digital image as unsaturated or with relatively low saturation; and gradually increasing the saturation over the predetermined time until the saturation reaches the received level of saturation for the color digital image.

In another example, the digital image of the method of the program product aspect lacks color (i.e. gray scale or black and white), the one or more characteristics includes contrast and the gradually rendering includes initially rendering the digital image with no contrast or relatively low contrast and gradually increasing the contrast over the predetermined time until the contrast of the digital image reaches the received level of contrast.

In one example, the digital image of the method of the program product aspect is associated with metadata, the metadata including a tag. The detecting includes recognizing the tag, the tag indicating that the digital image is a representation of an analog instant photo.

Having described embodiments of system 100 and corresponding methods 200, 300, and 400 for implementing the specialized slow/gradual digital image rendering processes set forth above among other features, an example of a computer environment for implementing the described design and execution is presented next.

Figure 8:
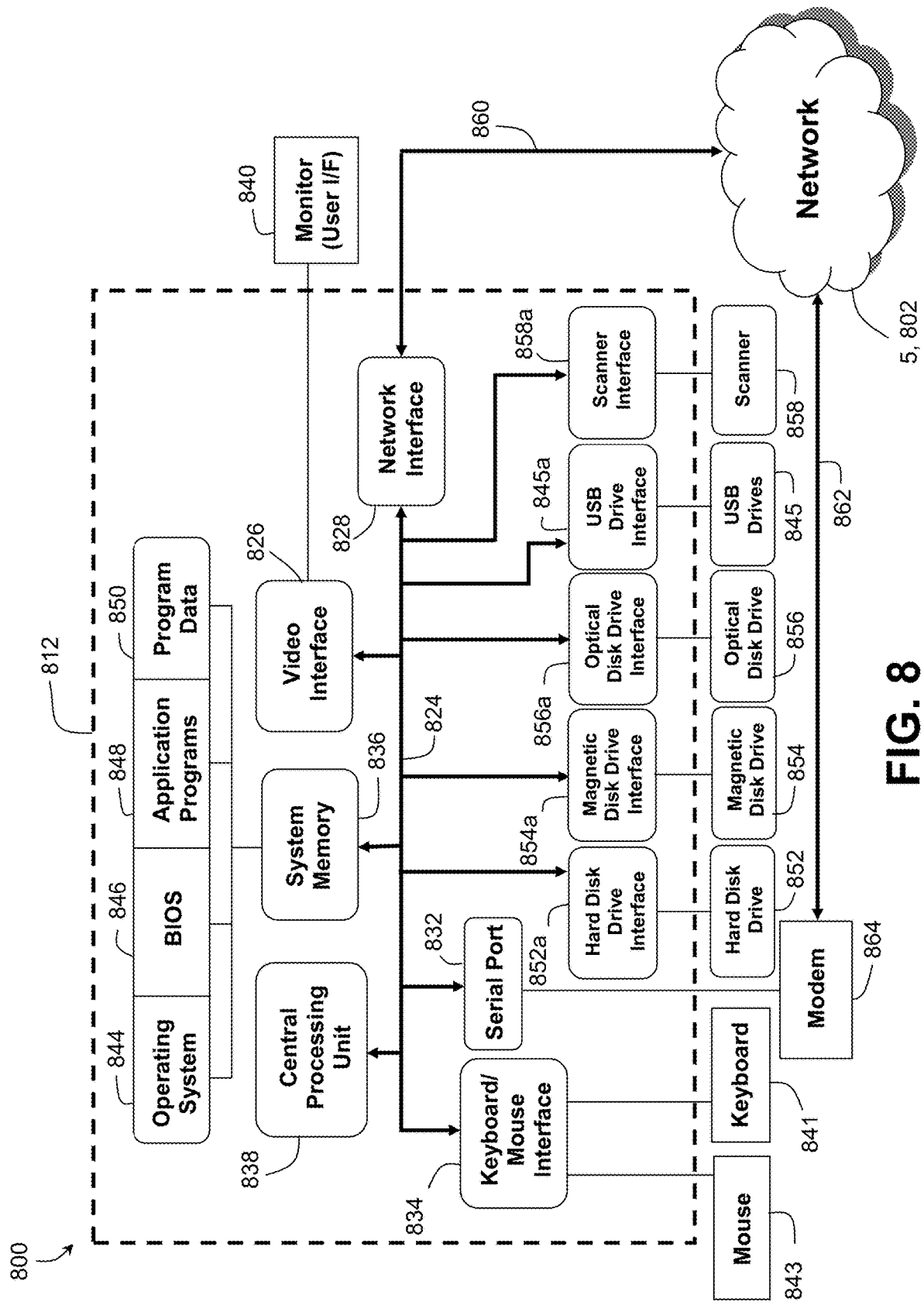
FIG. 8 is a block diagram generally illustrating a computing environment in which the invention may be implemented.

FIG. 8 shows the components of one example of a computing environment 800 that may be used to implement any of the methods and processing thus far described. The following description of computers also applies to the various user computing devices 30, 50, 60 and the server 70 for implementing system 100 and methods 200, 300, and 400 as described above with reference to FIGS. 2, 3, and 4. Computing environment 800 may include one or more computers 812 comprising a system bus 824 that couples a video interface 826, network interface 828, a keyboard/mouse interface 834, and a system memory 836 to a Central Processing Unit (CPU) 838. A monitor or display 840 is connected to bus 824 by video interface 826 and provides the user with a graphical user interface to view the digital images 25 as described above. The graphical user interface allows the user to enter commands and information into computer 812 using an interface control that may include a keyboard 841 and a user interface selection device 843, such as a mouse, touch screen, or other pointing device. Keyboard 841 and user interface selection device are connected to bus 824 through keyboard/mouse interface 834. The display 840 and user interface selection device 843 are used in combination to form the graphical user interface which allows the user to implement at least a portion of the present invention. Other peripheral devices may be connected to the remote computer through universal serial bus (USB) drives 845 to transfer information to and from computer 812. For example, cameras and camcorders may be connected to computer 812 through serial port 832 or USB drives 845 so that data representative of a digitally represented still image, video, audio or other digital content may be downloaded to memory 836 or another memory storage device associated with computer 812 such that the digital content may be transmitted to a server (such as server 70 of FIG. 1) in accordance with the present invention.

The system memory 836 is also connected to bus 824 and may include read only memory (ROM), random access memory (RAM), an operating system 844, a basic input/output system (BIOS) 846, application programs 848 and program data 850. The computer 812 may further include a hard disk drive 852 for reading from and writing to a hard disk, a magnetic disk drive 854 for reading from and writing to a removable magnetic disk (e.g., floppy disk), and an optical disk drive 856 for reading from and writing to a removable optical disk (e.g., CD ROM or other optical media). The computer 812 may also include USB drives 845 and other types of drives for reading from and writing to flash memory devices (e.g., compact flash, memory stick/PRO and DUO, SD card, multimedia card, smart media xD card), and a scanner 858 for scanning items such as still image photographs to be downloaded to computer 512. A hard disk drive interface 852a, magnetic disk drive interface 854a, an optical drive interface 856a, a USB drive interface 845a, and a scanner interface 858a operate to connect bus 824 to hard disk drive 852, magnetic disk drive 854, optical disk drive 856, USB drive 845 and scanner 858, respectively. Each of these drive components and their associated computer-readable media may provide computer 812 with non-volatile storage of computer-readable instruction, program modules, data structures, application programs, an operating system, and other data for computer 812. In addition, it will be understood that computer 812 may also utilize other types of computer-readable media in addition to those types set forth herein, such as digital video disks, random access memory, read only memory, other types of flash memory cards, magnetic cassettes, and the like.

Computer 812 may operate in a networked environment using logical connections with network 5, 802. Network interface 828 provides a communication path 860 between bus 824 and network 802, which allows, for example, digital images 25 and other information to be communicated to a server or database for storage and allowing access to other users. The digital images 25 and other information may also be communicated from bus 824 through a communication path 862 to network 802 using serial port 832 and a modem 864. It will be appreciated that the network connections shown herein are merely examples, and it is within the scope of the present invention to use other types of network connections between computer 812 and network 5, 802 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A system for rendering a digital image, the system comprising:
   a first computing device, comprising a display, a processor, and a memory storing computer readable instructions executable by the processor for performing a method, the method comprising:
   receiving a digital image at the first computing device from a source over a network, wherein the received digital image comprises one or more characteristics, wherein each of the one or more characteristics has a received level, wherein the received digital image is an image of a physical analog instant photo, and wherein the physical analog instant photo comprises a picture portion and an outer border portion surrounding the picture portion;
   detecting whether the received digital image is to be gradually rendered over a predetermined time in order to provide a user with a simulated experience of instant analog print developing, wherein the detecting is performed by computer executable code configured for image recognition; and
   when the detecting, utilizing image recognition, determines that the received digital image is the image of the physical analog instant photo, gradually rendering the received digital image on the display associated with the first computing device over the predetermined time, wherein the gradually rendering comprises increasing a level of at least one of the one or more characteristics until the level reaches the received level.

2. The system of claim 1, wherein the source comprises a second computing device, and wherein the receiving comprises directly receiving, by the first computing device the digital image from the second computing device.

3. The system of claim 2, wherein the directly receiving comprises the first computing device and the second computing device using a messaging application.

4. The system of claim 2, wherein the directly receiving comprises the first computing device and the second computing device using a short range communications protocol.

5. The system of claim 1, wherein the source comprises a server associated with a social media site, and wherein the first computing device receives the digital image after a request to download the digital image is made using the first computing device.

6. The system of claim 1, wherein the source comprises a server associated with a photo sharing site, and wherein the first computing device receives the digital image after a request to download the digital image is made using the first computing device.

7. The system of claim 1, wherein the gradually rendering comprises gradually rendering the picture portion over the predetermined time, the method further comprising rendering the outer border portion normally.

8. The system of claim 1, wherein the gradually rendering comprises gradually rendering the picture portion and the outer border portion over the predetermined time.

9. The system of claim 1, wherein the source comprises a second computing device sending the digital image to the first computing device over the network using an application, and wherein the application comprises an instant photography mode in one or more settings thereof.

10. The system of claim 1, wherein the gradually rendering comprises:
rendering a masking layer over the digital image, wherein the masking layer is initially opaque such that the digital image cannot be seen on the display; and
gradually decreasing opacity of the masking layer over the predetermined time until the masking layer is transparent.

11. The system of claim 10, wherein the source comprises a second computing device and wherein the receiving comprises directly receiving, by the first computing device, the digital image from the second computing device.

12. The system of claim 11, wherein the directly receiving comprises the first computing device and the second computing device using a messaging application.

13. The system of claim 1, wherein the digital image comprises a color digital image, wherein the one or more characteristics comprises saturation, and wherein the gradually rendering comprises:
initially rendering the color digital image as unsaturated or relatively low saturation; and
gradually increasing the saturation over the predetermined time until the saturation reaches the received level of saturation of the color digital image.

14. The system of claim 1, wherein the digital image lacks color, wherein the one or more characteristics comprises contrast, wherein the predetermined time includes a first predetermined time and a second predetermined time, and wherein the gradually rendering comprises:
initially rendering the digital image with no or relatively low contrast over the first predetermined time; and
gradually increasing the contrast over the second predetermined time until the contrast of the digital image reaches the received level of contrast.

15. A method programmed in a memory for execution by a processor in a computing environment for rendering a digital image, the method comprising:
receiving a digital image at a first computing device from a source over a network, wherein the digital image comprises one or more characteristics, wherein each of the one or more characteristics has a received level, wherein the received digital image is an image of a physical analog instant photo, and wherein the physical analog instant photo comprises a picture portion and an outer border portion surrounding the picture portion;
detecting whether the digital image is to be gradually rendered over a predetermined time in order to provide a user with a simulated experience of instant analog print developing, wherein the detecting is performed by computer executable code configured for image recognition; and
when the detecting, utilizing image recognition, determines that the digital image is the image of the physical analog instant photo, gradually rendering the digital image on a display associated with the first computing device over the predetermined time, wherein the gradually rendering comprises increasing a level of at least one of the one or more characteristics until the level reaches the received level.

16. A non-transitory program product storing thereon processor-executable instructions for performing a method, the method comprising:
receiving a digital image at a first computing device from a source over a network, wherein the digital image comprises one or more characteristics, wherein each of the one or more characteristics has a received level, wherein the received digital image is an image of a physical analog instant photo, and wherein the physical analog instant photo comprises a picture portion and an outer border portion surrounding the picture portion;
detecting whether the digital image is to be gradually rendered over a predetermined time in order to provide a user with a simulated experience of instant analog print developing, wherein the detecting is performed by computer executable code configured for image recognition; and
when the detecting, utilizing image recognition, determines that the digital image is the image of the physical analog instant photo, gradually rendering the digital image on a display associated with the first computing device over the predetermined time, wherein the gradually rendering comprises increasing a level of at least one of the one or more characteristics until the level reaches the received level.

* * * * *